US007209894B2

(12) United States Patent
Sugamura et al.

(10) Patent No.: US 7,209,894 B2
(45) Date of Patent: Apr. 24, 2007

(54) PROCESS DELAY MONITORING SYSTEM

(75) Inventors: Shiyouji Sugamura, Tokyo (JP); Takeshi Nishikido, Tokyo (JP); Hideyuki Kuroda, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 604 days.

(21) Appl. No.: 10/806,355

(22) Filed: Mar. 23, 2004

(65) Prior Publication Data

US 2004/0249722 A1 Dec. 9, 2004

(30) Foreign Application Priority Data

Mar. 31, 2003 (JP) .............................. 2003-096753

(51) Int. Cl.
*G06Q 30/00* (2006.01)
(52) U.S. Cl. .................. 705/26; 705/7; 705/8
(58) Field of Classification Search ................ 705/26, 705/27, 7, 8
See application file for complete search history.

(56) References Cited

U.S. PATENT DOCUMENTS

| 5,233,533 | A * | 8/1993 | Edstrom et al. ............ 700/103 |
| 6,226,561 | B1 * | 5/2001 | Tamaki et al. ............. 700/100 |
| 2001/0023376 | A1 * | 9/2001 | Uchida et al. ............. 700/101 |
| 2002/0188499 | A1 * | 12/2002 | Jenkins et al. ............ 705/10 |
| 2003/0050871 | A1 * | 3/2003 | Broughton ................. 705/28 |
| 2004/0030428 | A1 * | 2/2004 | Crampton et al. .......... 700/101 |

FOREIGN PATENT DOCUMENTS

| EP | 1 249 775 A2 | 10/2002 |
| JP | 09-064510 | * 3/1997 |
| JP | 2002-169995 | 6/2002 |
| JP | 2002-169996 | 6/2002 |
| JP | 2002-182722 | 6/2002 |
| JP | 2002-229620 | 8/2002 |
| JP | 2002-341927 | 11/2002 |
| JP | 2002-342431 | 11/2002 |

OTHER PUBLICATIONS

Freeman, Eva "Supply chain: modeling makes the difference.", Datamation, v43, n10, p. 64(5), Oct. 1997. Retrieved from Dialog File: 47, #04992527.*

* cited by examiner

*Primary Examiner*—Naeem Haq
(74) *Attorney, Agent, or Firm*—Arent Fox LLP

(57) ABSTRACT

This invention makes it possible to reduce excess inventory, reduce costs due to unnecessary shipping costs, and to improve reliability.

The invention comprises: a server 10 and brand manufacturer's terminal 20 that belong to a brand manufacturer which is the order-receiving party; a dealer's terminal 30 that belongs to the dealer which is the ordering party and that is connected to the server 10 via a communications line 50 such that they can communicate with each other; and a parts manufacturer's terminal 40 that belongs to the parts manufacturer and that is connected to the server 10 via a communications line 50 such that they can communicate with each other; and where the server 10 has a function of managing information about processing and process delays from the time when the order for parts is received from the dealer's terminal 30 until the scheduled delivery of the parts, and has a function of providing that information when there is access from the dealer's terminal 30.

4 Claims, 12 Drawing Sheets

List of Process Dates — Global Parts Tracking System

| Received-order Number | 01465-SL5-A00 (SET, FRONT BRAKE HOS) | | Present/past classification | 2 | P/C No. | 12C700Z | FOC | | Procurement manager | E1 |
| Allocated part number | 01465-SL5-A00 (SET, FRONT BRAKE HOS) | | Seal classification | X | ITEM No. | 16240 | Order ID | | Delivery location | |
| | | | 2/4 general classification | 4 | Order receiving data | 03/03/07 | Manufacturer code | HB04 | Receiving No. | |
| | | | year classification | 4 | QUANTITY | 17 | Order ID | | Sales Classification | |

The display format for the date is YY/MM/DD. This data was updated on 03/03/12 at 10:35.

| | | Received Order | B/O | Order | Delivery received | Seal | Allocation | Warehouse removal | Packaging 1 | Packaging 2 | Vanning |
|---|---|---|---|---|---|---|---|---|---|---|---|
| Record | Date | 03/03/07 | | | | | 03/03/07 | | 03/03/11 | | |
| | Time | 21:00 | | | | | 21:00 | | 19:15 | | |
| Schedule | At the time order was received | | 03/03/08 | 03/03/08 | 03/04/24 | 03/04/24 | | 03/04/25 | 03/04/28 | 03/05/01 | 03/05/02 |
| | Latest | | | | 40 | 0 | | 1 | 2 | 2 | 03/03/14 |
| Standard Procedure (number of days) | | | 0 | 0 | | | | | | | 1 |

Details of (2) on the previous page.

Fig.8(b)

HONDA The Power of Dreams — List of Specifications (Delay) — Global Parts Tracking System Process session: Packaging The display format of the date is YY/MM/DD. This data was updated on 03/03/12 at 11:21.

| Received Order | B/O | Order | Delivery received | Seal | Order-receiving date | Received-order classification | Allocation | ITEM No. | Packaging 1 | Packaging 2 | Vanning | Customs Clearance | Port Departure | Port Entry | DIST arrival | P/C NO. | Part number | Order number | SCM account | Ordered quantity | Quantity | Received order cost | Completed process | Process completion date | Schedule DIST arrival date |
|---|---|---|---|---|---|---|---|---|---|---|---|---|---|---|---|---|---|---|---|---|---|---|---|---|---|
| | | 04 | | | 03/03/11 | | | 16510 | | | | | | | | 12C700Z | 04111-PY3-000 | | | 20 | 20 | 170.40US$ | Packaging | 03/03/11 | 03/03/27 |
| | | 04 | | | 03/03/11 | | | 16510 | | | | | | | | 12C700Z | 04111-PY3-000 | | | 20 | 20 | 170.40US$ | Packaging | 03/03/11 | 03/03/27 |
| | | 04 | | | 03/03/07 | | | 16610 | | | | | | | | 12C700Z | 01600-SZ3-310ZZ | | | 6 | 2 | 248.82US$ | Packaging | 03/03/11 | 03/03/27 |
| | | 04 | | | 03/03/07 | | | 16610 | | | | | | | | 12C700Z | 04600-SZ3-310ZZ | | | 6 | 3 | 248.82US$ | Packaging | 03/03/11 | 03/03/27 |
| | | 04 | | | 03/03/07 | | | 16610 | | | | | | | | 12C700Z | 04600-SZ3-310ZZ | | | 6 | 3 | 284.82US$ | Packaging | 03/03/11 | 03/03/27 |
| | | 04 | | | 03/03/07 | | | 16610 | | | | | | | | 12C700Z | 04600-SZ3-310ZZ | | | 6 | 2 | 248.82US$ | Packaging | 03/03/11 | 03/03/27 |
| | | 04 | | | 03/03/07 | | | 16610 | | | | | | | | 12C700Z | 04600-SZ3-310ZZ | | | 6 | 2 | 248.82US$ | Packaging | 03/03/11 | 03/03/27 |
| | | 04 | | | 03/03/07 | | | 03910 | | | | | | | S | 161700 | R516A-S7C-N11 | | | 4 | 4 | 210.12US$ | Packaging | 03/03/11 | 03/03/27 |

1-56/56

PROCESS DELAY MONITORING SYSTEM

BACKGROUND OF THE INVENTION

1. Field of the Invention

This invention relates to a process-delay-monitoring system of monitoring process delays in processing ordered parts for motorcycles, automobiles or general parts (generators, cultivator, or the like).

2. Description of the Related Art

In the distribution of parts for motorcycles, automobiles or general parts (generators, cultivator, or the like), when a brand manufacturer receives an order from a domestic or overseas dealer, it checks its own warehouse inventory and orders insufficient parts from the parts manufacturer. Here, when the ordering party is an overseas dealer (for example, in North America), it normally takes 3 months for the ordered parts to arrive. During this time, when there is a next order, the ordering party makes the order before the first ordered parts arrive.

The order-receiving party or brand manufacturer receives similar orders everyday from a plurality of domestic and overseas ordering parties. The ordering party notifies the order-receiving party of the order contract number or PC (Purchase Contract) number for each order unit. The order-receiving party manages the ordered parts for each of the same PC numbers. When managing the parts, the implementation record is managed in PC number units for each process after receiving the order. A normal supply-chain management method is used for management in PC number units. In recent years, together with the supply chain, the implementation-record-management database may also be released to the ordering party. Normally, this is called tracking.

However, in this normal supply-chain management method, just the implementation record is managed, so the ordering party does not know when the ordered parts will arrive. Therefore, there is a tendency for the ordering party to keep an excess of safety stock. Also, since the order-receiving party does not manage the parts in transit, there is no follow up in the case of trouble. Therefore, unneeded shipping costs and the like are incurred. Furthermore, due to these problems, the trust of the ordering party is lost, and encourages having an unnecessary safety stock.

Incidentally, as a means of improving the delivery rate for parts, there is a restocking management system as disclosed in patent document 1. In order to improve the rate of prompt delivery from a sales location to fill a customer's order, the management server performs an update process for updating the target amount of inventory at each sales location based on order information received from a terminal at each sales location; and based on the amount of new orders and changes in the amount of target inventory, it calculates the amount of parts to be restocked at each sales location and outputs restocking-instruction information to the location that has jurisdiction over distribution, and furthermore, each sales location calculates the amount of excess stock based on the difference between the target amount of stock and the actual amount of available stock, and outputs collection information to the corresponding sales locations and the location that has jurisdiction over distribution.

Patent Document 1

Japanese Patent Publication No. 2002-342431

PROBLEMS TO BE SOLVED BY THE INVENTION

In the patent document described above, the amount to restock parts at each sales location is calculated based on the amount of newly received orders and the change in the target amount of inventory, and a proper amount of surplus inventory is kept based on the difference between the target amount of inventory and the actual amount of available inventory.

Therefore, in patent document 1, as was explained above, only the implementation record is managed, and the ordering party does not know when the ordered parts will arrive, so there is a possibility that excess safety stock will be kept.

Also, in patent document 1, since the order-receiving party does not manage the parts in transit, there is no follow up for trouble, so there is a possibility that unnecessary shipping costs and the like will be incurred.

Furthermore, in patent document 1, due to these kinds of problems, there is a possibility that reliability in the order-receiving party will be lost, and encourage keeping unnecessary safety stock.

SUMMARY OF THE INVENTION

Taking into consideration the problems above, the object of this invention is to provide a process-delay-monitoring system that is capable of reducing excess stock, reducing costs such as unnecessary shipping costs, and improving reliability.

MEANS FOR SOLVING THE PROBLEMS

The process-delay-monitoring system of this invention comprises: a server and brand manufacturer's terminal that belong to a brand manufacturer, which is the order-receiving party; a dealer's terminal that belongs to the dealer, which is the ordering party and that is connected to the server via a communications line such that they can communicate with each other; and a parts manufacturer's terminal that belongs to the parts manufacturer and that is connected to the server via a communications line such that they can communicate with each other; and where the server has a function of managing information about processing and process delays from the time when the order for parts is received from the dealer's terminal until the scheduled delivery of the parts, and has a function of providing information about the processing and process delays of the parts being managed, when there is access from the dealer's terminal; and where the brand manufacturer's terminal is used when entering various information and has a communications and display function; the dealer's terminal is connected to the server and is used when giving instructions for ordering parts and viewing information about processing and process delays of the parts, and has a communications and display function; and where the parts manufacturer's terminal receives procurement information from the brand manufacturer's terminal related to the procurement of parts, and has a communications and display function; and where an order contract number is used when accessing the server from the dealer's terminal and brand manufacturer's terminal to view information about processing and process delays for a part.

Also, the server comprises: a received-order database in which the contents of the order received from the dealer's terminal is registered; a work-in-progress database in which the received-order information contained in the received-order contents registered in the received-order database, the ITEM No. for managing that received-order information, and the ID number attached to the ITEM No. are registered; a procurement database in which procurement information for parts ordered from the parts manufacturer is registered; an inventory database in which inventory information for a part and delivery information from the parts manufacturer are registered; a registered-information-management-function unit that has a function of registering received-order contents in the received-order database, registering received-order information in the work-in-progress database, and registering procurement information in the procurement database and work-in-progress database; a management-number-issuing-function unit that has the function of issuing ITEM Nos. for managing the received-order information after the received-order information has been registered; an inventory-check-function unit that has the function of checking from the inventory database whether or not there is inventory after received-order information has been registered by the registered-information-management-function unit; an allocation-process-function unit that has the function of performing an allocation process for the inventory when the inventory-check-function unit checked and determined there was inventory; a distribution-calculation-function unit that has the function of calculating the distribution and cost of the insufficient part of an order based on the quantity when the inventory-check-function unit checked and determined there is insufficient inventory; a schedule-creation-function unit that has the function of creating a schedule of processing after the date and time that the allocation process was performed when the allocation process was performed by the allocation-process-function unit; a schedule-correction-function unit that has the function of calculating a corrected procedure of processing after it is determined by comparison with the standard procedure that there will be a delay for the insufficient portion, when the inventory-check-function unit checked and determined there was insufficient inventory; and a search-function unit that has the function of searching the information registered in the work-in-progress database according to a work-in-progress-search instruction from the dealer's terminal or brand manufacturer's terminal when there is access from the dealer's terminal or brand manufacturer's terminal, and providing the information to the dealer's terminal or brand manufacturer's terminal; and where the management-number-issuing-function unit has the function of issuing an ID number that is attached to the ITEM No. for managing the procurement information when the inventory-check-function unit checked and determined there was insufficient inventory.

Also, the registered-information-management-function unit can register the ITEM NO. that was issued by the management-number-issuing-function unit and the ID number that is attached to the ITEM No. in the work-in-progress database, register the results of the calculation by the distribution-calculation-function unit in the work-in-progress database, register the schedule created by the schedule-creation-function unit in the work-in-progress database and register the corrected schedule that was created by the schedule-correction-function unit in the work-in-progress database.

The process-delay-monitoring system of this invention is a process-delay-monitoring system comprising: a server and brand manufacturer's terminal that belong to the brand manufacturer, which is the order-receiving party; a dealer's terminal that belongs to the dealer which is the ordering party and that is connected to the server via a communications line such that they can communicated together; and a parts manufacturer's terminal that belongs to the parts manufacturer that is connected to the server via a communications line such that they can communicated together; and where the server has a process of managing information about processing and process delays from the time when the order for parts is received from the dealer's terminal until the scheduled delivery of the parts, and has a process of providing information about the processing and process delays of the parts being managed, when there is access from the dealer's terminal or brand manufacturer's terminal; and where the brand manufacturer's terminal is used when entering various information and has a communications and display process; the dealer's terminal is connected to the server and is used when giving instructions for ordering parts and viewing information about processing and process delays of the parts, and has a communications and display process; and where the parts manufacturer's terminal receives procurement information from the brand manufacturer's terminal related to the procurement of parts, and has a communications and display process; and where an order contract number is used when accessing the server from the dealer's terminal to view information about processing and process delays for a part.

Also, the server comprises: a received-order database in which the contents of the order received from the dealer's terminal is registered; a work-in-progress database in which the received-order information contained in the received-order contents registered in the received-order database, the ITEM No. for managing that received-order information, and the ID number attached to the ITEM No. are registered; a procurement database in which procurement information for parts ordered from the parts manufacturer is registered; and an inventory database in which inventory information for a part and delivery information from the parts manufacturer are registered; a process of registering received-order contents in the received-order database, registering received-order information in the work-in-progress database, and registering procurement information in the procurement database and work-in-progress database by a registered-information-management-function unit; a process of issuing ITEM Nos. for managing the received-order information by a management-number-issuing-function unit after the received-order information has been registered; a process of checking from the inventory database by an inventory-check-function unit whether or not there is inventory after received-order information has been registered by the registered-information-management-function unit; a process of performing an allocation process by an allocation-process-function unit for the inventory when the inventory-check-function unit checked and determined there was inventory; a process of calculating the distribution and cost of the insufficient part of an order by a distribution-calculation-function unit based on the quantity when the inventory-check-function unit checked and determined there was insufficient inventory; a process of creating a schedule by a schedule-creation-function unit for processing after the date and time that the allocation process was performed when the allocation process was performed by the allocation-process-function unit; a process of calculating by a schedule-correction-function unit a corrected procedure for processing after it is determined by comparison with the standard procedure that there will be a delay for the insufficient inventory, when the inventory-check-function unit checked and determined there was insufficient inventory and creating a corrected schedule; and a process of searching the information registered in the work-in-progress database by a work-in-progress search-function unit according to a work-in-progress-search instruction from the dealer's terminal or brand manufacturer's terminal when there is access from the dealer's terminal or brand manufacturer's terminal, and providing the information to the dealer's terminal or brand manufacturer's terminal; and where the management-number-issuing-function unit has a process of issuing an ID number that is attached to the ITEM No. for managing the procurement information when the inventory-check-function unit checked and determined there was insufficient inventory.

Also, the registered-information-management-function unit can have a process of registering the ITEM NO. that was issued by the management-number-issuing-function unit and the ID number that is attached to the ITEM No. in the work-in-progress database, a process of registering the results of the calculation by the distribution-calculation-function unit in the work-in-progress database, a process of registering the schedule created by the schedule-creation-function unit in the work-in-progress database and a process of registering the corrected schedule that was created by the schedule-correction-function unit in the work-in-progress database.

EFFECT OF THE INVENTION

The process-delay-monitoring system of the invention described above comprises: a server and brand manufacturer's terminal that belong to a brand manufacturer which is the order-receiving party; a dealer's terminal that belongs to the dealer which is the ordering party and that is connected to the server via a communications line such that they can communicate with each other; and a parts manufacturer's terminal that belongs to the parts manufacturer and that is connected to the server via a communications line such that they can communicate with each other; and where the server manages information about processing and process delays from the time when the order for parts is received from the dealer's terminal until the scheduled delivery of the parts, and provides that information when there is access from the dealer's terminal, so it is possible to reduce excess inventory, and reduce costs due to unnecessary shipping costs and the like, and thus it is possible to improve reliability.

DESCRIPTION OF THE PREFERRED EMBODIMENT

An embodiment of the invention will be explained below. In the explanation below, the case in which the dealer is overseas will be explained.

Figure 1:
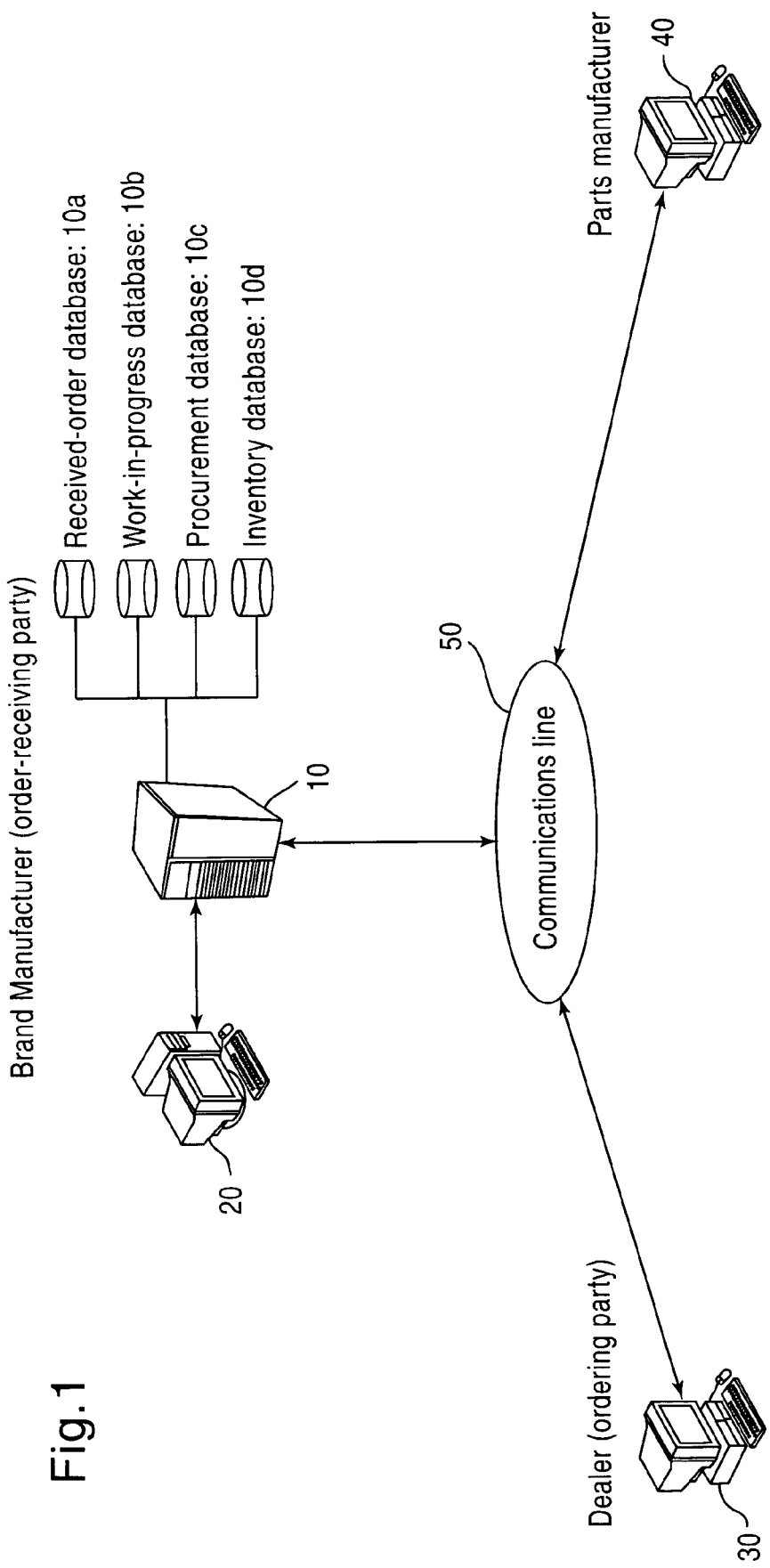
FIG. 1 is a drawing showing an embodiment of the process-delay-monitoring system of this invention.

FIG. 1 shows an embodiment of the process-delay-monitoring system of this invention and comprises: the server 10 and the brand manufacturer's terminal 20 that belong to the brand manufacturer which is the order-receiving party; the dealer's 30 terminal that belongs to the dealer which is the ordering party; and the parts manufacturer's terminal 40 that belongs to the parts manufacturer; and these are all such that they can communicate with each other over a communications line 50. To simplify the explanation, only one dealer's terminal 30 and one parts manufacturer's terminal 40 are shown, however, of course there could be a plurality of each kind of terminal. Also, the dealer's terminal 30 could be either a domestic or overseas terminal. The Web, WAN (Wide Area Network) or dedicated line could be used as the communications line 50.

The server 10 manages processing and process delays starting from when an order for parts is issued from the dealer's terminal 30 until the parts are schedule for delivery, and it comprises: a received-order database (D/B) 10*a*, a work-in-progress database (D/B) 10*b*, a procurement database (D/B) 10*c*, and an inventory database (D/B) 10*d*.

The contents of orders received from the dealer's terminal 30 which is the ordering party, are registered in the received-order database 10*a*. The received-order information (1) to (11) below that is contained in the registered received-order contents in the received-order database 10*a*, and ITEM Nos. for managing that received-order information are registered in the work-in-progress database 10*b*.

The following items (1) to (11) below are included in the received-order information:

(1) Ordered part number: This is also called the account number. The account number is a part number comprising numbers and alphabet letters that are listed in the parts list.

(2) Part name: Part name (3) Current and past classifications: Current: Parts for a model currently in production. Past: Parts for an already old model.

(4) 2/4 General classifications: 2: Motorcycle 4: Automobile General: General parts (generator, cultivator, etc.)

(5) Year classification: Identification numbers for classifying models into models in production, 5-year old models, 10-year old models, other old models.

(6) Date order is received.

(7) Time order is received.

(8) PC (Purchase Contract) number (9) Received order cost

(10) Order region: Region where the ordering party is located (Example: North America, Europe, Southeast Asia, etc.).

(11) Order type: Shipping method desired by the ordering party (Example: Ship, air, etc.).

Also, procurement information for ordering parts from the parts manufacturer that where determined by a inventory check to be in stock but insufficient, and identification numbers that are attached to the ITEM Nos. for managing that procurement information are registered in the work-in-progress database 10*b*.

The following items (12) to (18) below are included in the procurement information:
(12) Ordered quantity
(13) FOC: Forecast of Control (Forecast control)
(14) Order ID: Identification of order method
(15) Manufacturer code
(16) Order number
(17) Procurement manager: Indicated by a code number.
(18) Delivery location The procurement information (12) to (18) above that is registered in the work-in-progress database 10b is registered in the procurement database 10c.

Inventory information, delivery information and the like for parts are registered in the inventory database 10d.

Figure 2:
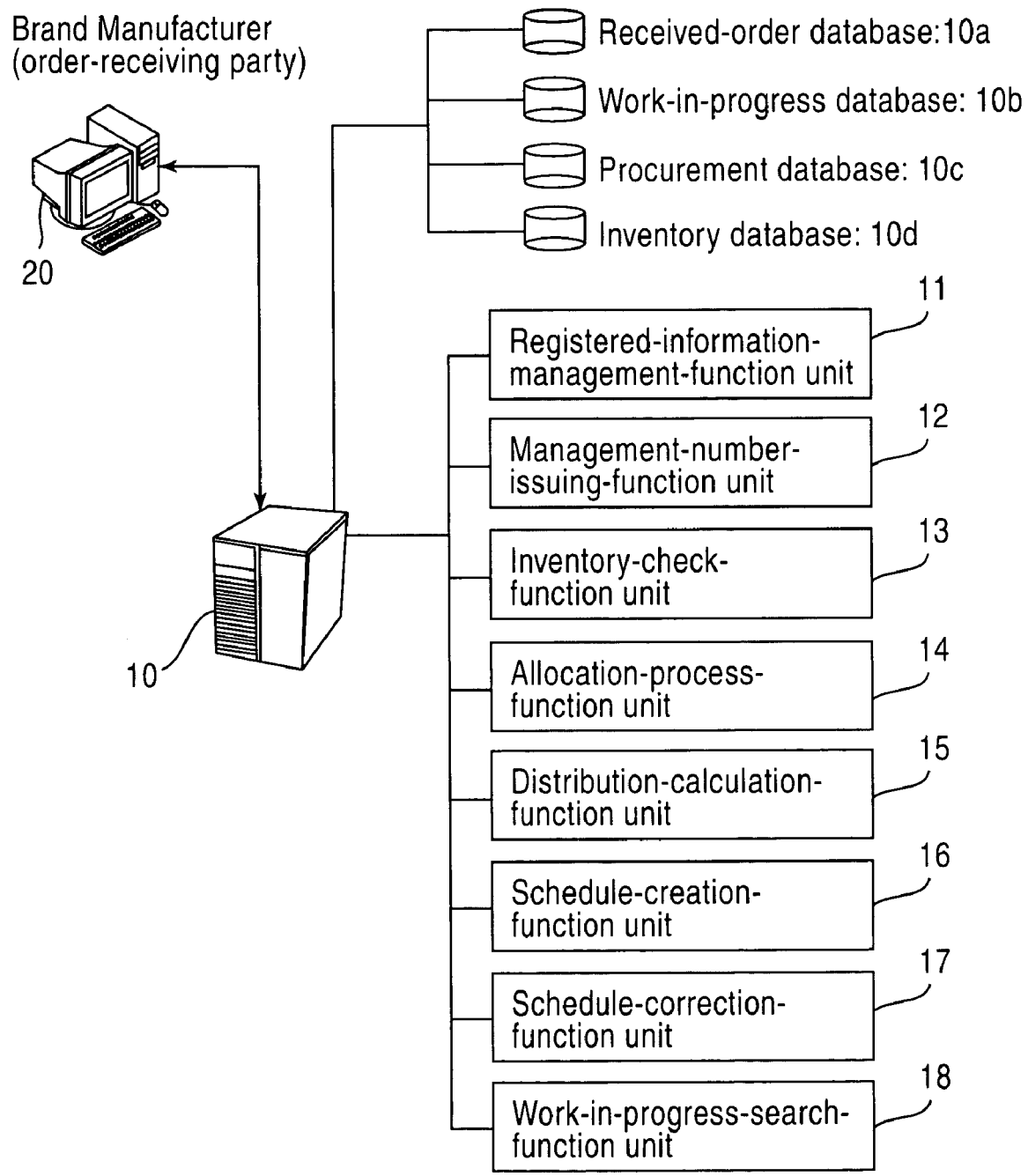
FIG. 2 is a drawing for explaining details about the process-delay-monitoring system shown in FIG. 1.

Moreover, as shown in FIG. 2, the server 10 comprises: a registered-information-management-function unit 11, management-number-issuing-function unit 12, inventory-check-function unit 13, allocation-process-function unit 14, distribution-calculation-function unit 15, schedule-creation-function unit 16, schedule-correction-function unit 17 and work-in-progress-search-function unit 18.

The registered-information-management-function unit 11 has the function of registering the contents of the received order in the received-order database 10a, registering the received-order information in the work-in-progress database 10b, and registering the procurement information in the procurement database 10c and work-in-progress database 10b. The management-number-issuing-function unit 12 has the function of issuing ITEM Nos. for managing the received-order information, and ID numbers that are attached to the ITEM Nos. for managing the procurement information.

When received-order information is registered by the registered-information-management-function unit 11, the inventory-check-function unit 13 has the function of checking from the inventory database 10d whether or not there is inventory. When checking whether or not there is inventory, the order part numbers are used. When the inventory-check-function unit 13 checks whether or not there is inventory, the allocation-process-function unit 14 has a function of performing an allocation process on the inventory.

When inventory was checked and found to be insufficient by the inventory-check-function unit 13, the distribution-calculation-function unit 15 has the function of calculating the distribution cost of that insufficient portion based on the quantity. The results of the distribution calculation are registered in the work-in-progress database 10b by the registered-information-management-function unit 11. When the allocation process is performed by the allocation-process-function unit 14, the schedule-creation-function unit 16 has the function of creating a schedule for processing after the date and time that that allocation process was performed. That schedule is created based on the standards (number of days) that were set beforehand. Also, the created schedule is registered in the work-in-progress database 10b by the registered-information-management-function unit 11.

When the inventory is checked by the inventory-check-function unit 13 and found to be insufficient, the schedule-correction-function unit 17 has the function of making a comparison with the standard procedure (number of days) for the insufficient portion, and when it is determined there will be a delay, calculating a corrected procedure for post processing and creating a corrected schedule. That created corrected schedule is registered in the work-in-progress database 10b by the registered-information-management-function unit 11. When there is access from the dealer's terminal 30, the work-in-progress-search-function unit 18 has the function of searching the information registered in the work-in-progress database 10b according to a work-in-progress search instruction from the dealer's terminal 30 and providing that information to the dealer's terminal 30.

The brand manufacturer's terminal 20 is used when entering various information, and it has a communication function and display function. The various information entered includes for example: received-order information, date and time of allocation process, date and time of an order to the parts manufacturer, procurement information for the parts manufacturer, date and time for receiving a delivery, date and time of removal from the warehouse, date and time of packaging, invoice number, date and time of port departure, date and time of port entry, etc.

The dealer's terminal 30 is used when viewing order instruction or information that is registered in the work-in-progress database 10b, and it has a communication function and display function. Also, when using the dealer's terminal 30 to view information registered in the work-in-progress database 10b, a PC (Purchase Contract) number, which is the contract number for the order, is used.

The parts manufacturer's terminal 40 receives procurement information from the brand manufacturer's terminal 20 and has a communication function and display function.

Next, the operation of the process-delay-monitoring system will be explained.

Figure 3:
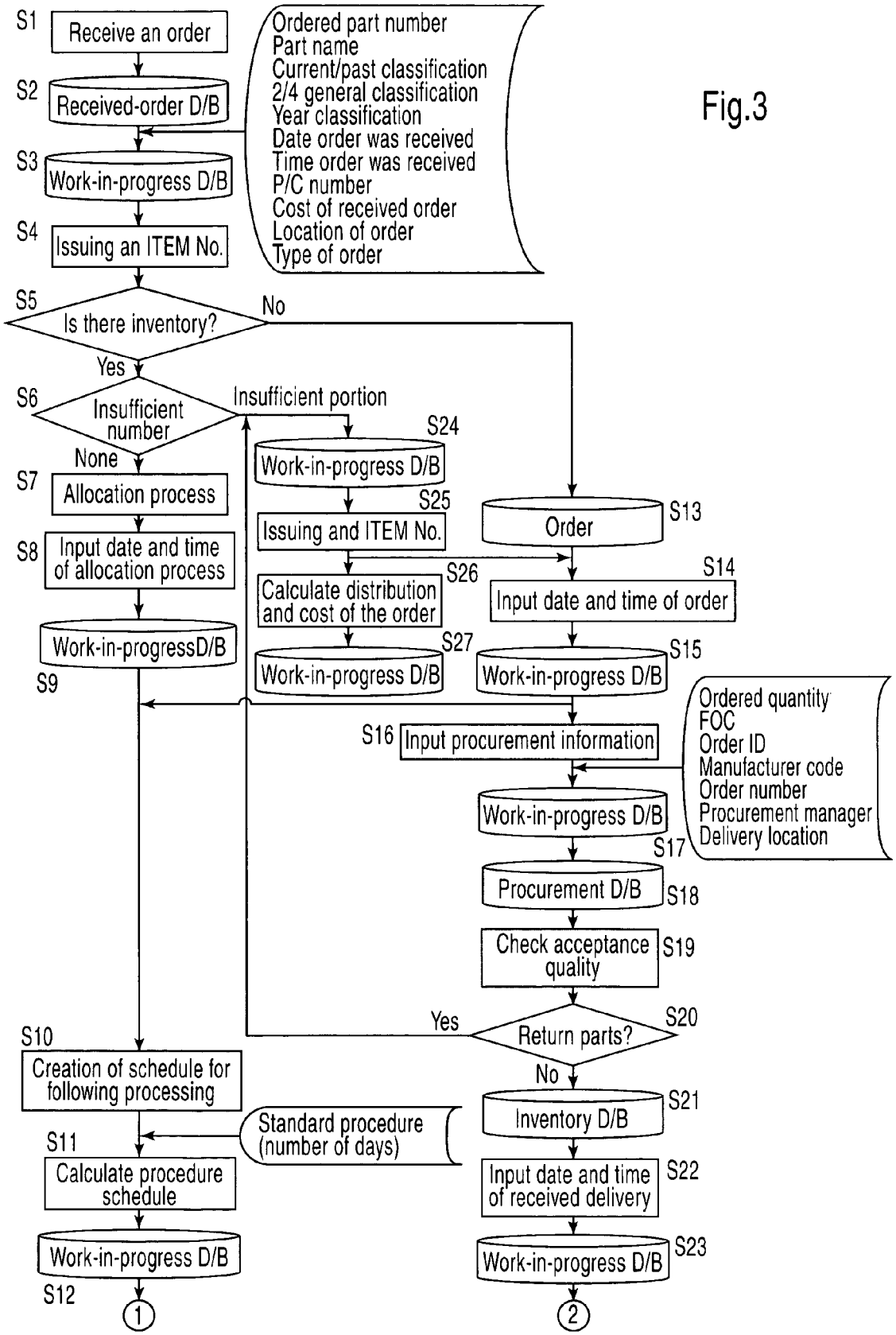
FIG. 3 is a flowchart for explaining the operation of the process-delay-monitoring system shown in FIG. 1.

First, as shown in FIG. 3, an order is received from the dealer's terminal 30 (step S1), and when the contents of that received order are entered using the brand manufacturer's terminal 20, the entered received-order contents are registered in the received-order database 10a by the registered-information-management-function unit 11 (step S2). Also, after the received-order contents have been registered, the received-order information (1) to (11) described above is registered in the work-in-progress database 10b by the registered-information-management-function unit 11 (step S3). At this time, ITEM Nos. for managing that received-order information are assigned by the management-number-issuing-function unit 12 and registered in the work-in-progress database 10b (step S4).

After the received-order information has been registered in the work-in-progress database 10b, the received-order part numbers are used by the inventory-check-function unit 13 to check from the inventory database 10d whether or not there is inventory (step S5), and when there is inventory, the number of insufficient parts is checked (step S6). When there are no insufficient parts, the allocation-process-function unit 14 performs the allocation process for the parts in inventory, and after the date and time of that allocation process is entered using the brand manufacturer's terminal 20, the entered date and time of that allocation process is registered in the work-in-progress database 10b (steps S7 to S9). After the date and time of the allocation process have been registered in the work-in-progress database 10b, the schedule-creation-function unit 16 creates the schedule and calculates the procedure schedule (steps S10, S11). Calculation of the procedure schedule is performed based on preset standards (number of days). Also, the schedule for processing after the procedure schedule has been calculated is registered in the work-in-progress database 10b (step S12).

On the other hand, in step S5, when there is no inventory, parts must be ordered from the parts manufacturer, and the date and time of that order is registered in the work-in-progress database 10b (steps S13 to S15). Next, for the portion to be ordered from the parts manufacturer, the procurement information (12) to (18) described above is entered using the brand manufacturer's terminal 20, and that procurement information is registered in the work-in-progress database 10*b* (steps S16, S17). The procurement information that is registered in the work-in-progress database 10*b* is also registered in the procurement database 10*c* (step S18). Also, the procurement information that is registered in the procurement database 10*c* is send to the parts manufacturer's terminal 40. When there is a delivery from the parts manufacturer based on this procurement information, the product quality is checked, and when there are no parts to be returned, the information for the delivered parts is registered in the inventory database 10*d* (steps S19 to S21). Next, after the delivery receiving date has been entered, that delivery receiving date is register in the work-in-progress database 10*b* (steps S22, S23).

On the other hand, in step S6, when there are insufficient parts, and in step S20 when there are parts to be returned, the management-number-issuing-function unit 12 issues an ID number to be assigned to the ITEM No. for managing the procurement information, and further, the distribution-calculation-function unit 15 calculates the cost of the received order based on the quantity, and the result is registered in the work-in-progress database 10*b* (steps S24 to S27).

Figure 4:
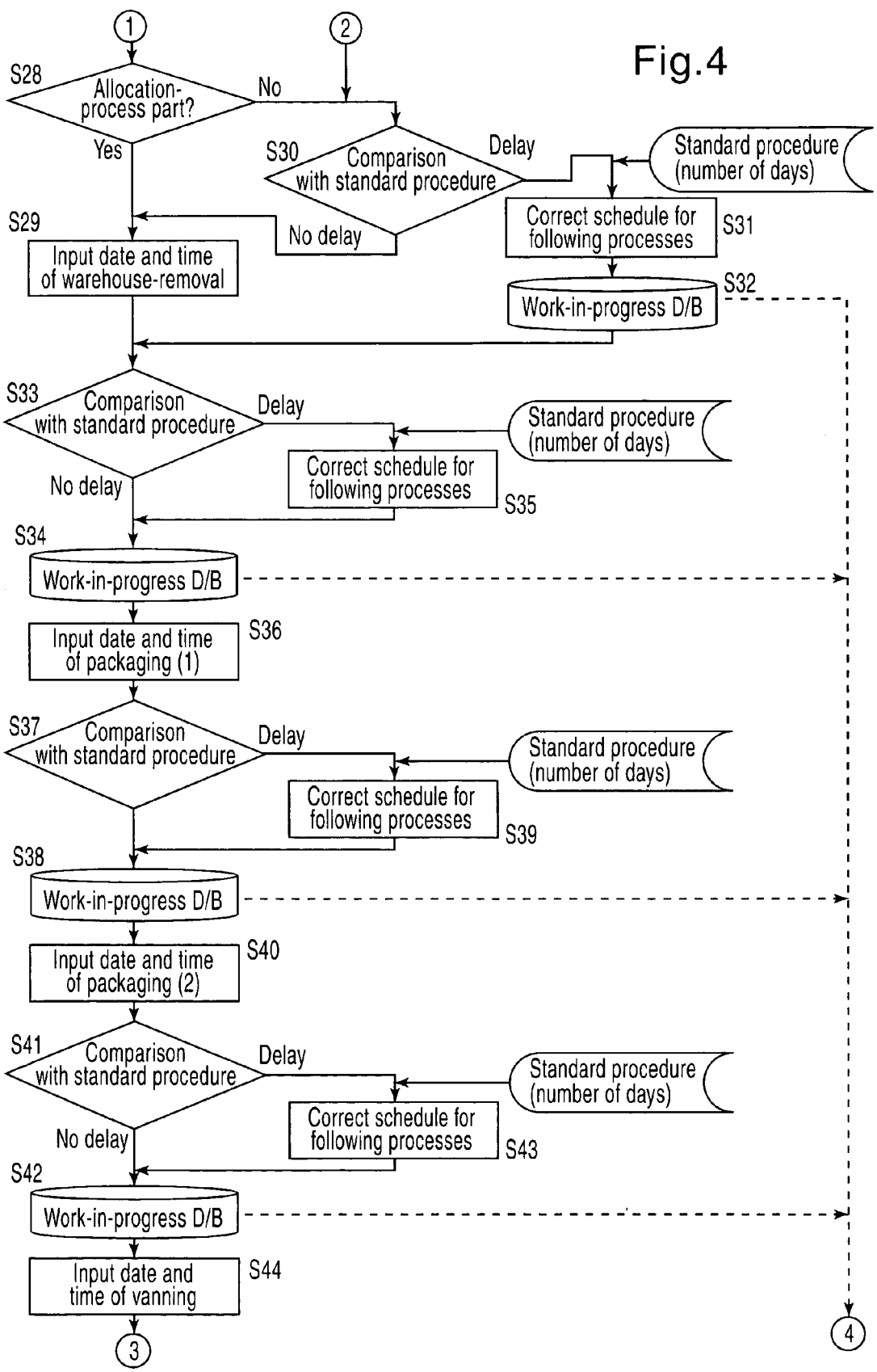
FIG. 4 is a flowchart for explaining the operation of the process-delay-monitoring system shown in FIG. 1.

Next, as shown in FIG. 4, the part is checked whether it is an allocation-process part (step S28). In other words, an allocation-process part is a part in the brand manufacturer's inventory, and a part that is not an allocation-process part is a part that is delivered from the parts manufacturer. In the case of an allocation-process part, the following work or warehouse-removal process is performed, and when the warehouse-removal process is completed, the warehouse-removal date and time are entered (step S29). The warehouse-removal date and time are registered in the work-in-progress database 10*b*. In this case, the warehouse-removal date and time can automatically be entered by scanning the barcode of the part specifications attached to the part.

On the other hand, when the part is not an allocation-process part, the procedure is compared with the standard (number of days) (step S30), and when it is determined there would be no delay, the input becomes the warehouse-removal date and time entered in (step S29), and when it is determined there will be a delay, the schedule-correction-function unit 17 performs schedule correction based on the standard procedure (number of days), and the created corrected schedule is registered in the work-in-progress database 10*b* (steps S31, S32). Here, the standard procedure (number of days) is the procedure in the first schedule calculated and created from the date and time of the received order. Also, the object of the comparison in step S30 is the record of delivery receiving dates with respect to this first schedule.

Also, the warehouse-removal date is compared with the standard procedure (number of days) (step S33), and when there will be no delay, the first schedule is registered in the work-in-progress database 10*b* (step S34). However, when there will be a delay, the schedule-correction-function unit 17 corrects the schedule for the following processing based on the standard procedure (number of days) (step S35), and the created corrected schedule is registered in the work-in-progress database 10*b* (step S34).

Next, the date and time that packaging (1) was performed is entered (step S36), and by making a comparison with the standard procedure (number of days) (step S37), when there will be no delay, the date that packaging (1) was performed is registered in the work-in-progress database 10*b* (step S38). However, when there will be a delay, the schedule-correction-function unit 17 corrects the schedule for the following processing based on the standard procedure (number of days) (step S39), and the created corrected schedule is registered in the work-in-progress database 10*b* (step S38).

Similarly, the date and time that packaging (2) was performed is entered (step S40), and by making a comparison with the standard procedure (number of days) (step S41), when there will be no delay, the date that packaging (2) was performed is registered in the work-in-progress database 10*b* (step S42). However, when there will be a delay, the schedule-correction-function unit 17 corrects the schedule for the following processing based on the standard procedure (number of days) (step S43), and the created corrected schedule is registered in the work-in-progress database 10*b* (step S42).

Figure 5:
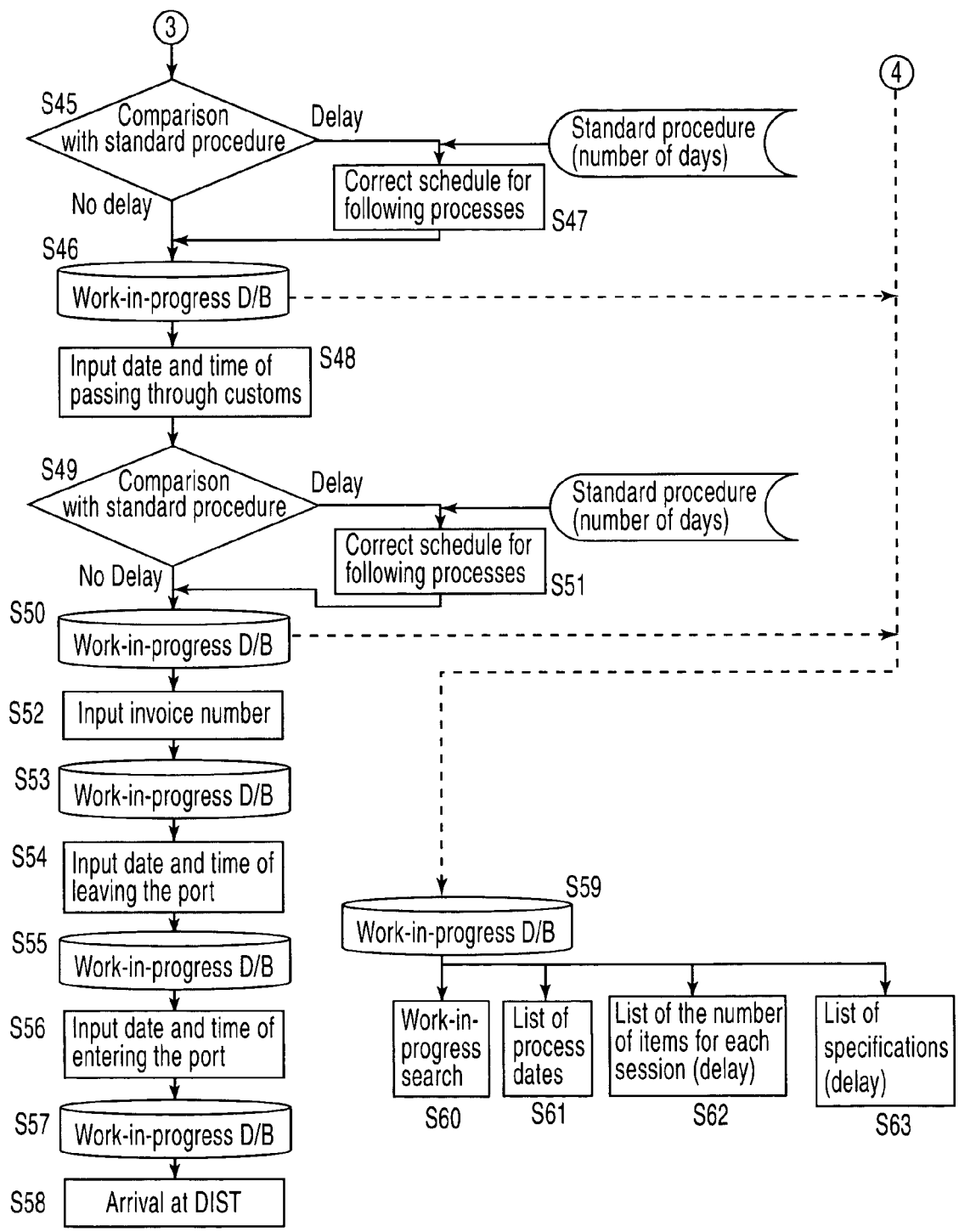
FIG. 5 is a flowchart for explaining the operation of the process-delay-monitoring system shown in FIG. 1.

Similarly, when the vanning date and time is entered (step S44), as shown in FIG. 5, by making a comparison with the standard procedure (number of days) (step S45), when there will be no delay, that vanning date and time are registered in the work-in-progress database 10*b* (step S46). However, when there will be a delay, the schedule-correction-function unit 17 corrects the schedule for the following processing based on the standard procedure (number of days) (step S47), and the created corrected schedule is registered in the work-in-progress database 10*b* (step S46).

Similarly, when the customs-clearance date and time is entered (step S48), by making a comparison with the standard procedure (number of days) (step S49), when there will be no delay, that customs-clearance date and time are registered in the work-in-progress database 10*b* (step S50). However, when there will be a delay, the schedule-correction-function unit 17 corrects the schedule for the following processing based on the standard procedure (number of days) (step S51), and the created corrected schedule is registered in the work-in-progress database 10*b* (step S50).

Next, after the invoice number is issued during customs clearance, the entered invoice number is registered in the work-in-progress database 10*b* (steps S52, S53). Here, the invoice number indicates that the parts have left the port, and for the ordering party, it becomes the management number when receiving the parts. Also, both the date and time the parts left the port and the date and time the parts entered the port are registered in the work-in-progress database 10*b* (steps S54 to S57), and after that, the parts arrive at the DIST (distributor) (step S58).

Here, when the server 10 is accessed from the dealer's terminal 30, the work-in-progress-search-function unit 18 responds and it becomes possible to view the information registered in the work-in-progress database 10*b*. When viewing the information registered in the work-in-progress database 10*b*, the PC number described above is used. Also, for example, as shown in steps S60 to S63, a work-in-progress-search screen, a screen showing a list of dates for each process, a screen showing a list of items for each session, and a screen showing specifications are displayed at the dealer's terminal 30. The list of items of each session, and the list of specifications give data for parts that are delayed from the first schedule.

Figure 6A:
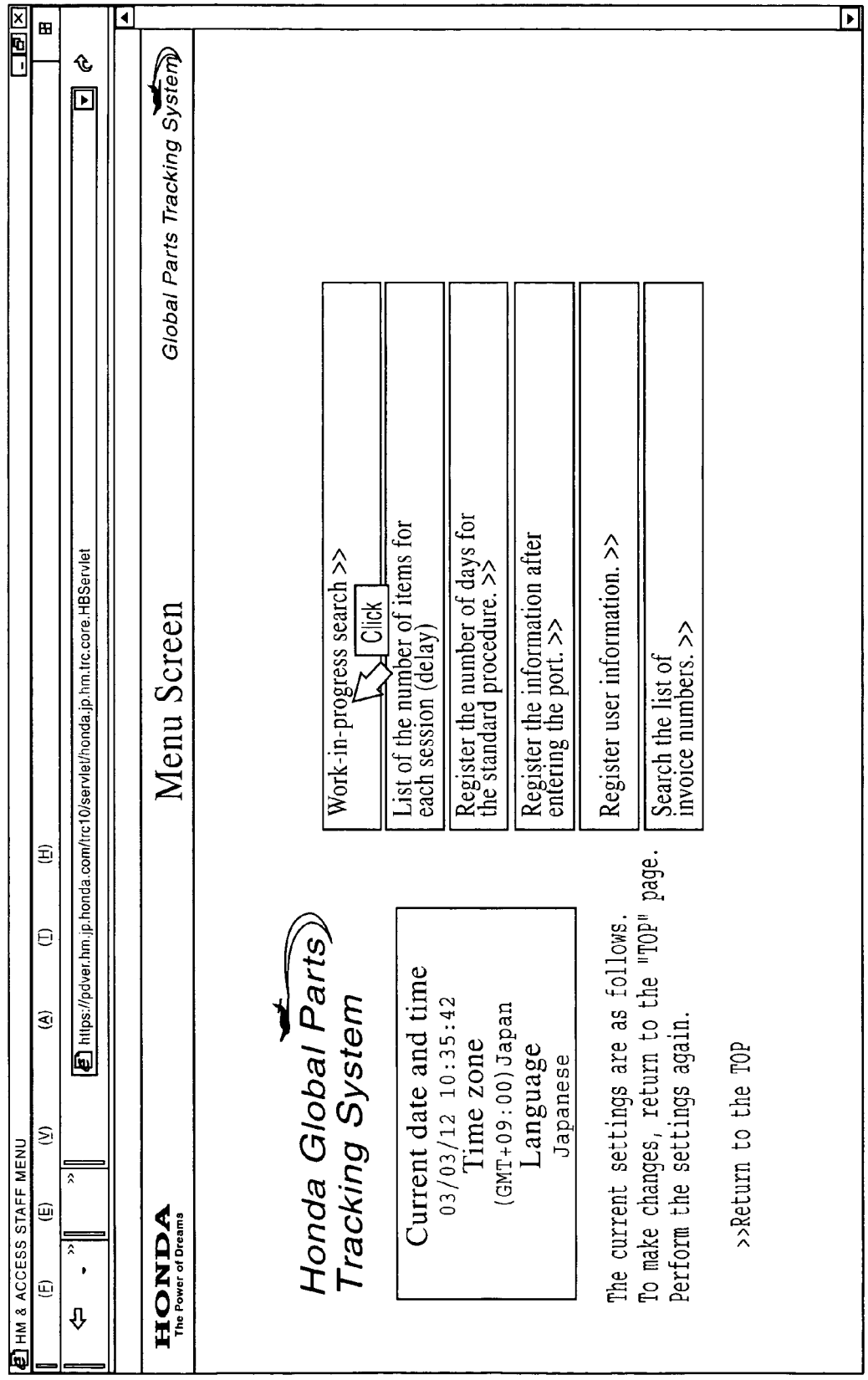
FIG. 6 is a drawing for explaining the screen contents related to the work-in-progress search by process-delay-monitoring system shown in FIG. 1.

Here, for example, when a search-menu screen is displayed at the dealer's terminal 30 as shown in FIG. 6(*a*), and the item 'Search work in progress' is clicked on from that screen, the detail screen for the work-in-progress search is displayed as shown in FIG. 6(*b*). Here, as check items for specifying the search pattern there are (PC/NO), (ORD REF NO), and (ordering location+receiving location+part number). Here, when (PC/NO) is selected and the PC number described above is entered, the search results are displayed as shown in FIG. 7(*a*). From the search results, it is possible to know whether or not processing is complete for each part number, which are the part numbers of the received order, and it is possible to check the date that processing was completed, the scheduled date of arrival, etc. Also, in the search results shown in FIG. 7(a), when the field for a part number, which is a part number of the received order, is selected, the list of data for each process corresponding to the selected part number is displayed as shown in FIG. 7(b). From this it is possible to check details of each process from when the part is ordered until it arrives at the DIST (distributor). Moreover, in the search results shown in FIG. 7(a), when one of the quantity fields is selected for example, a list of details for the selected quantity is displayed as shown in FIG. 7(c). From this it is possible to check details about the quantity. The screens shown in FIG. 7(a) to FIG. 7(c) are updated according to changes in the contents, so it is possible to check the contents shown in FIG. 7(a) to FIG. 7(c) in realtime.

Figure 6B:
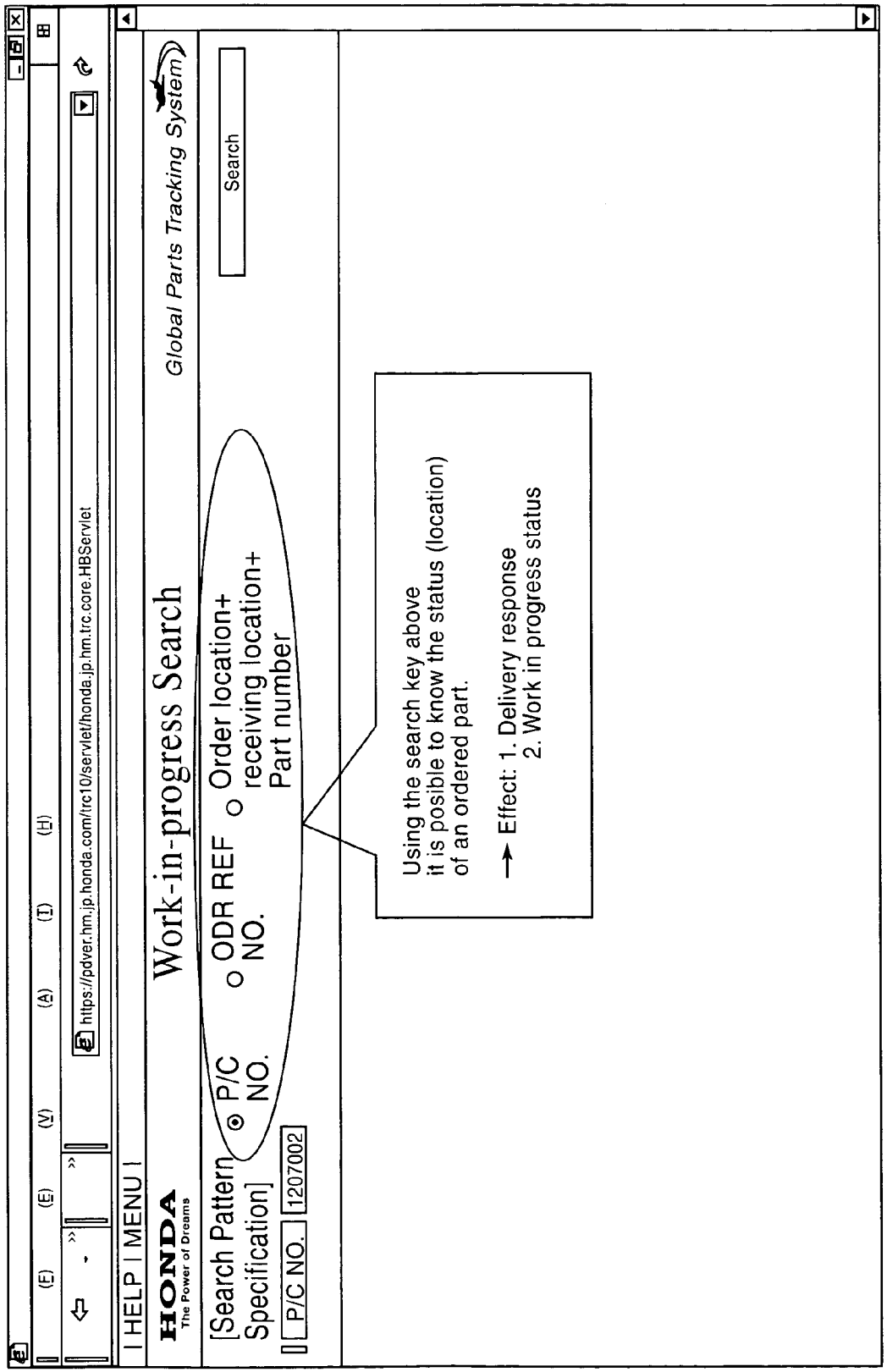
Figure 7C:
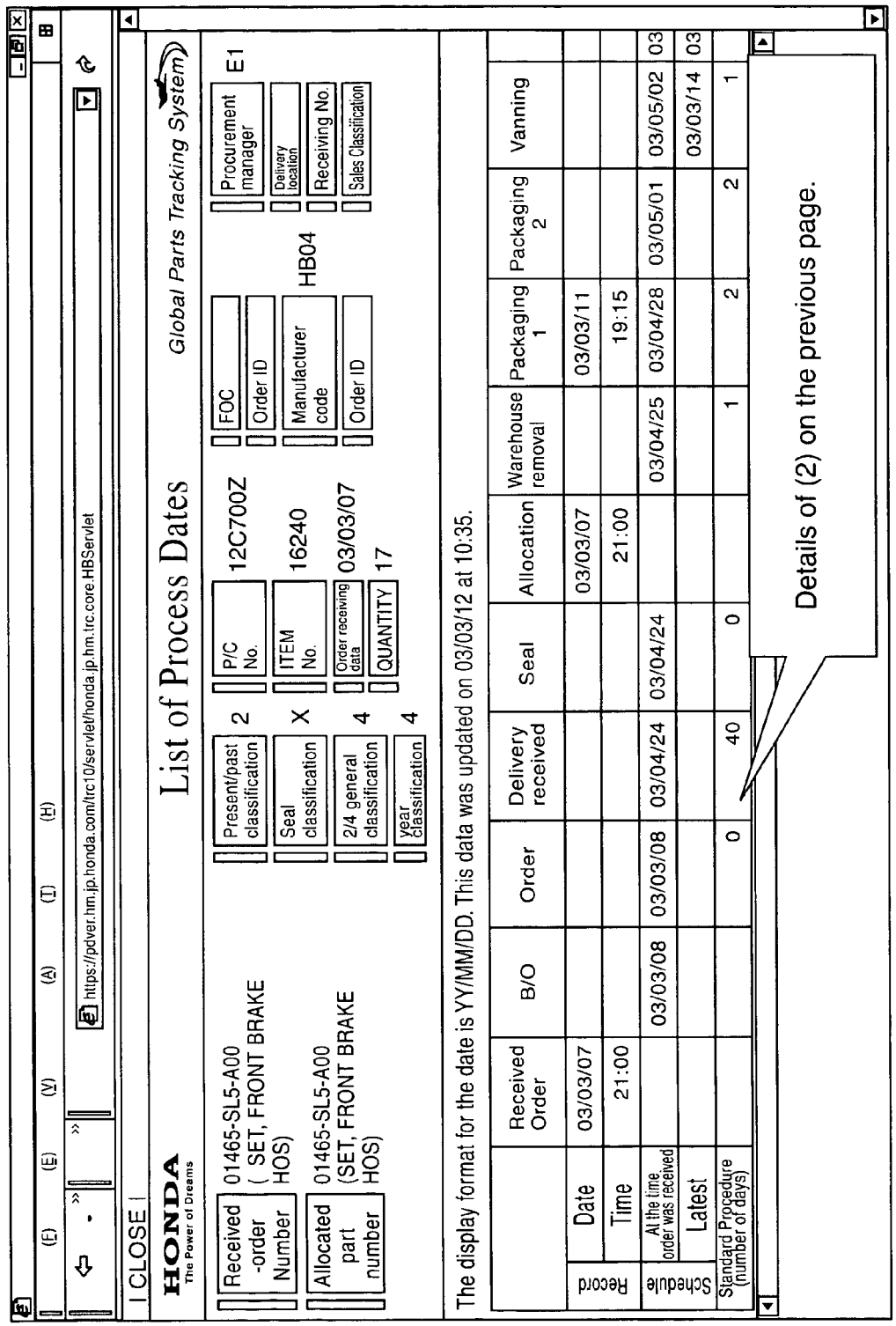
FIG. 7 is a drawing for explaining the screen contents related to the work-in-progress search by process-delay-monitoring system shown in FIG. 1.
Figure 8A:
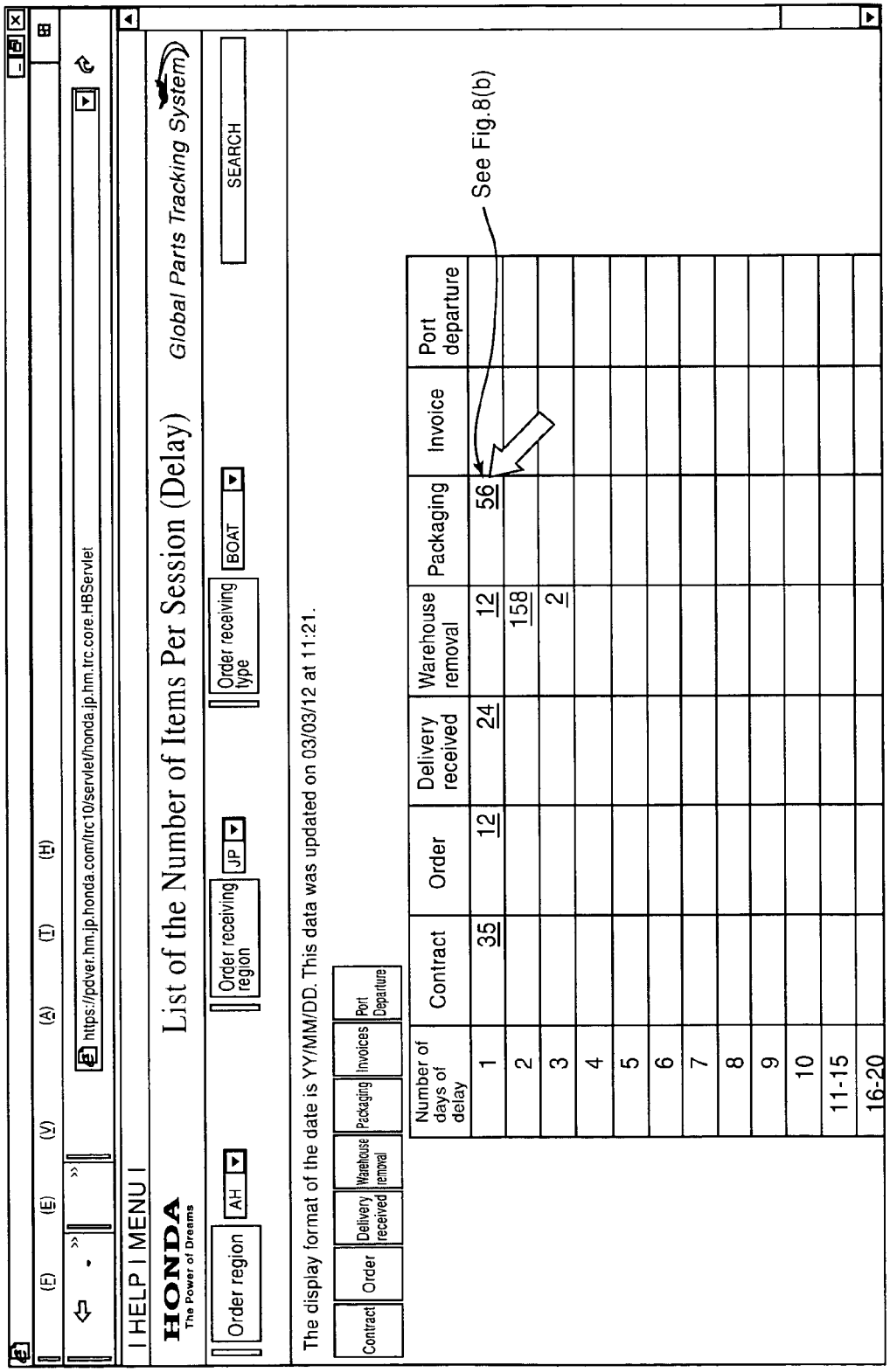
FIG. 8 is a drawing for explaining the screen contents related to the work-in-progress search by process-delay-monitoring system shown in FIG. 1.

Also, when (ordering location+receiving location+part number) is selected on the screen shown in FIG. 6(b), a list of the number of case for each session is displayed as shown in FIG. 8(a). On this screen, it is possible to check the number of items for each process and number of days of delay. The contents of this screen are similarly updated according to changes in the contents, so it is possible to check the list of the number of items for each session in realtime. Furthermore, when one of the items is selected on this screen, a list of details (delay) corresponding to each part number is displayed as shown in FIG. 8(b). Similarly, this screen is updated according to changes in the contents, so it is possible to check the scheduled date of arrival in realtime.

In this way, this embodiment of the invention comprises: a server 10 and brand manufacturer's terminal 20 that belong to the brand manufacturer, which is the order-receiving party; a dealer's terminal 30 that belongs to the dealer which is the ordering party and that is connected to the server 10 such that it can communicate via a communication line 50, and a parts manufacturer's terminal 40 that belongs to the parts manufacturer and that is connected to the server 10 such that it can communicate via a communication line 50, and where the server 10 manages the processing and process delays from when the order for parts is received from the dealer's terminal 30 until the parts are scheduled for delivery, and that information is provided according to access from the dealer's terminal 30.

By doing this, since it is possible to check in realtime the information about processing and process delays from the time the order is received until the scheduled delivery of the parts, it is possible for the ordering party to easily know when the ordered parts will be delivered, and thus there is no need for keeping excess safety stock.

Also, on the order-receiving side, by registering the information about processing and process delays from the time the order is received until the scheduled delivery of the parts in the work-in-progress database 10b, together with making a comparison with the standard procedure (number of days), when there are process delays, the information for each delay is registered in the work-in-progress database 10b, so management during transit can be performed, and follow can be easily performed for trouble, and thus it is possible to do away with unnecessary shipping costs.

Moreover, the information about process delays is provided to the ordering party in realtime, so it is possible to improve trust in the order-receiving party, and there is no incitement to have unnecessary safety stock.

Furthermore, by increasing trust in the ordering party, trust by the end user also increases, so as a result reliability of the supply chain is improved.

What is claimed is:

1. A process-delay-monitoring system comprising:
 a server and brand manufacturer's terminal that belong to a brand manufacturer which is an order-receiving party;
 a dealer's terminal that belongs to a dealer which is an ordering party and that is connected to said server via a communications line such that they can communicate with each other; and
 a parts manufacturer's terminal that belongs to a parts manufacturer and that is connected to said server via a communications line such that they can communicate with each other, and
wherein said server has a processor that executes program instructions comprising:
 receiving an order for parts from said dealer's terminal;
 managing information about processing and process delays from the time when said order for parts is received from said dealer's terminal until the scheduled delivery of the parts;
 providing information about said processing and process delays of the parts being managed to said dealer's terminal;
wherein said brand manufacturer's terminal transmits various information and has a communications and display function, and
wherein said dealer's terminal has a communications and display function and is connected to said server in order to display instructions for ordering said parts and viewing information about said processing and process delays of the parts, and
wherein said parts manufacturer's terminal has a communications and display function and receives procurement information from said brand manufacturer's terminal related to the procurement of said parts, and
wherein said server is accessed from said dealer's terminal and brand manufacturer's terminal by using an order contract number to view information about said processing and process delays for a part,
 wherein said server further comprises:
  a received-order database that stores order information received from said dealer's terminal;
  a work-in-progress database that stores order information, an ITEM No. for managing the order information, and an ID number attached to said ITEM No.;
  a procurement database that stores procurement information for parts ordered from said parts manufacturer;
  an inventory database in which inventory information for said part and delivery information from said parts manufacturer are registered;
  a registered-information-management-function unit that registers said order information in said received-order database, registers said order information in said work-in progress database, and registers said procurement information in said procurement database and said work-in-progress database;
  a management-number-issuing-function unit that issues ITEM Nos. for managing said order information after said order information has been registered;
  an inventory-check-function unit that checks from said inventory database whether or not there is inventory after said order information has been registered by said registered-information-management-function unit;

an allocation-process-function unit that performs an allocation process for the inventory after said inventory-check-function unit checked and determined there was inventory;

a distribution-calculation-function unit that calculates a distribution and cost of an insufficient part of the order based on a quantity after said inventory-check-function unit checked and determined there was insufficient inventory;

a schedule-creation-function unit that creates a schedule of processing after a date and time that the allocation process was performed by said allocation-process-function unit;

a schedule-correction-function unit that calculates a corrected procedure of processing after it is determined by comparison with a standard procedure that there will be a delay for the insufficient part, after said inventory-check-function unit checked and determined there was insufficient inventory; and a search-function unit that searches information stored in said work-in-progress database according to a work-in-progress-search instruction from said dealer's terminal or said brand manufacturer's terminal when there is access from said dealer's terminal or said brand manufacturer's terminal, and provides said information to said dealer's terminal or said brand manufacturer's terminal, wherein said management-number-issuing-function unit issues an ID number that is attached to said ITEM No. for managing said procurement information after said inventory-check-function unit checked and determined there was insufficient inventory.

2. The process-delay-monitoring system of claim 1 wherein said registered-information-management-function unit registers said ITEM No. that was issued by said management-number-issuing-function unit and the ID number that is attached to said ITEM No. in said work-in-progress database, registers the results of the calculation by said distribution-calculation-function unit in said work-in-progress database, registers the schedule created by said schedule-creation-function unit in said work-in-progress database, and registers the corrected schedule that was created by said schedule-correction-function unit in said work-in-progress database.

3. A process-delay-monitoring method comprising:

providing a server and brand manufacturer's terminal that belong to the brand manufacturer which is an order-receiving party;

providing a dealer's terminal that belongs to a dealer which is an ordering party and that is connected to said server via a communications line such that they can communicated together; and providing a parts manufacturer's terminal that belongs to the parts manufacturer that is connected to said server via a communications line such that they can communicated together; and that monitors process delays from the time when the order for parts is received from said dealer's terminal until the scheduled delivery of said parts, and wherein said server has a processor that executes program instructions comprising:

receiving an order for parts from said dealer's terminal;

managing information about processing and process delays from the time when said order for parts is received from said dealer's terminal until the scheduled delivery of the parts;

providing information about said processing and process delays of the parts being managed to said dealer's terminal;

entering various information into said brand manufacturer's terminal; and transmitting an order for parts from said dealer's terminal to said server; and receiving and viewing, by said dealer's terminal, information about processing and process delays of said parts transmitted by said server; and receiving, by said parts manufacturer's terminal, procurement information from said brand manufacturer's terminal related to procurement of said parts; and accessing said server from said dealer's terminal and brand manufacturer's terminal by using an order contract number to view information about said processing and process delays for a part, wherein said server further performs the steps comprising:

storing order information received from said dealer's terminal in a received-order database; and storing order information, an ITEM No. for managing the order information, and an ID number attached to said ITEM No. in a work-in-progress database; and storing procurement information of parts ordered from said parts manufacturer in a procurement database; and storing inventory information of said part and delivery information from said parts manufacturer in an inventory database; and registering, by a registered-information-management-function unit, order information received from said dealer's terminal in said received-order database; and registering, by a registered-information-management-function unit, order information received from said dealer's terminal in said work-in-progress database; and registering, by a registered-information-management-function unit, said procurement information in said procurement database and said work-in-progress database; and issuing an ITEM No. for managing said order information by a management-number-issuing-function unit after said received-order information has been registered; and checking from said inventory database by an inventory-check-function unit whether or not there is inventory after said order information has been registered by said registered-information-management-function unit; and performing an allocation process by an allocation-process-function unit for the inventory after said inventory-check-function unit checked and determined there was inventory; and calculating a distribution and cost of an insufficient part of an order by a distribution-calculation-function unit based on a quantity after said inventory-check-function unit checked and determined there was insufficient inventory; and creating a schedule by a schedule-creation-function unit of processing after a date and time that the allocation process was performed when the allocation process was performed by said allocation-process-function unit; and calculating by a schedule-correction-function unit a corrected procedure of processing after it is determined by comparison with a standard procedure that there will be a delay for the insufficient part after said inventory-check-function unit checked and determined there was insufficient inventory; and searching information stored in said work-in-progress database by a search-function unit according to a work-in-progress-search instruction from said dealer's terminal or brand manufacturer's terminal when there is access from said dealer's terminal, and providing said information to said dealer's terminal, wherein said management-number-issuing-function unit has a process of issuing an ID number that is attached to said ITEM No. for managing said procurement information after said inventory-check-function unit checked and determined there was insufficient inventory.

4. The process-delay-monitoring method of claim 3 wherein said registered-information-management-function unit can has a process of registering said ITEM NO. that was issued by said management-number-issuing-function unit and said ID number that is attached to said ITEM No. in said work-in-progress database, a process of registering the results of the calculation by said distribution-calculation-function unit in said work-in-progress database, a process of registering the schedule created by said schedule-creation-function unit in said work-in-progress database, and a process of registering the corrected schedule that was created by said schedule-correction-function unit in said work-in-progress database.

* * * * *